(12) United States Patent
Onose et al.

(10) Patent No.: US 11,366,444 B2
(45) Date of Patent: Jun. 21, 2022

(54) PLC DEVICE AND CONTROL DEVICE

(71) Applicant: FANUC CORPORATION, Yamanashi (JP)

(72) Inventors: Nao Onose, Yamanashi (JP); Mitsuru Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/871,219

(22) Filed: May 11, 2020

(65) Prior Publication Data
US 2020/0409329 A1 Dec. 31, 2020

(30) Foreign Application Priority Data

Jun. 28, 2019 (JP) ............................. JP2019-121422

(51) Int. Cl.
*G05B 19/05* (2006.01)
*G05B 19/414* (2006.01)
*G05B 19/408* (2006.01)

(52) U.S. Cl.
CPC ......... *G05B 19/058* (2013.01); *G05B 19/408* (2013.01); *G05B 19/414* (2013.01)

(58) Field of Classification Search
CPC ... G05B 19/058; G05B 19/408; G05B 19/414
USPC .......................................................... 700/1
See application file for complete search history.

(56) References Cited

U.S. PATENT DOCUMENTS

| | | | | |
|---|---|---|---|---|
| 5,797,033 A | * | 8/1998 | Ecclesine | G06F 13/28 710/22 |
| 2004/0095883 A1 | * | 5/2004 | Chu | H04L 47/193 370/235 |
| 2012/0065748 A1 | * | 3/2012 | Nixon | G05B 21/02 700/73 |
| 2019/0253497 A1 | * | 8/2019 | Yoneda | H04L 67/12 |
| 2020/0366513 A1 | * | 11/2020 | Yoneda | H04L 12/28 |

OTHER PUBLICATIONS

Article: "When reading CNC information with WINDR and WINDW" (https://www.pmcladder.infor/pmc/19) dated Oct. 19, 2009 with English translation.

* cited by examiner

*Primary Examiner* — Rocio Del Mar Perez-Velez
*Assistant Examiner* — Christopher W Carter
(74) *Attorney, Agent, or Firm* — Wenderoth, Lind & Ponack, L.L.P.

(57) ABSTRACT

To enable acquisition of operation information of CNC corresponding to periodic operation of PLC, even when the CNC is unable to respond due to the timing of machining, the loading status, etc. The PLC device includes: a special instruction control unit that sets, to a special instruction for acquiring operation information indicating an operation state of a control device from the control device controlling an industrial machine, a cyclic time for causing the control device to periodically acquire and retain the operation information in a case in which the control device is unable to respond, and transmits to the control device the special instruction in which the cyclic time is set; and an acquisition unit that acquires the operation information acquired on the basis of the cyclic time from the control device.

5 Claims, 4 Drawing Sheets

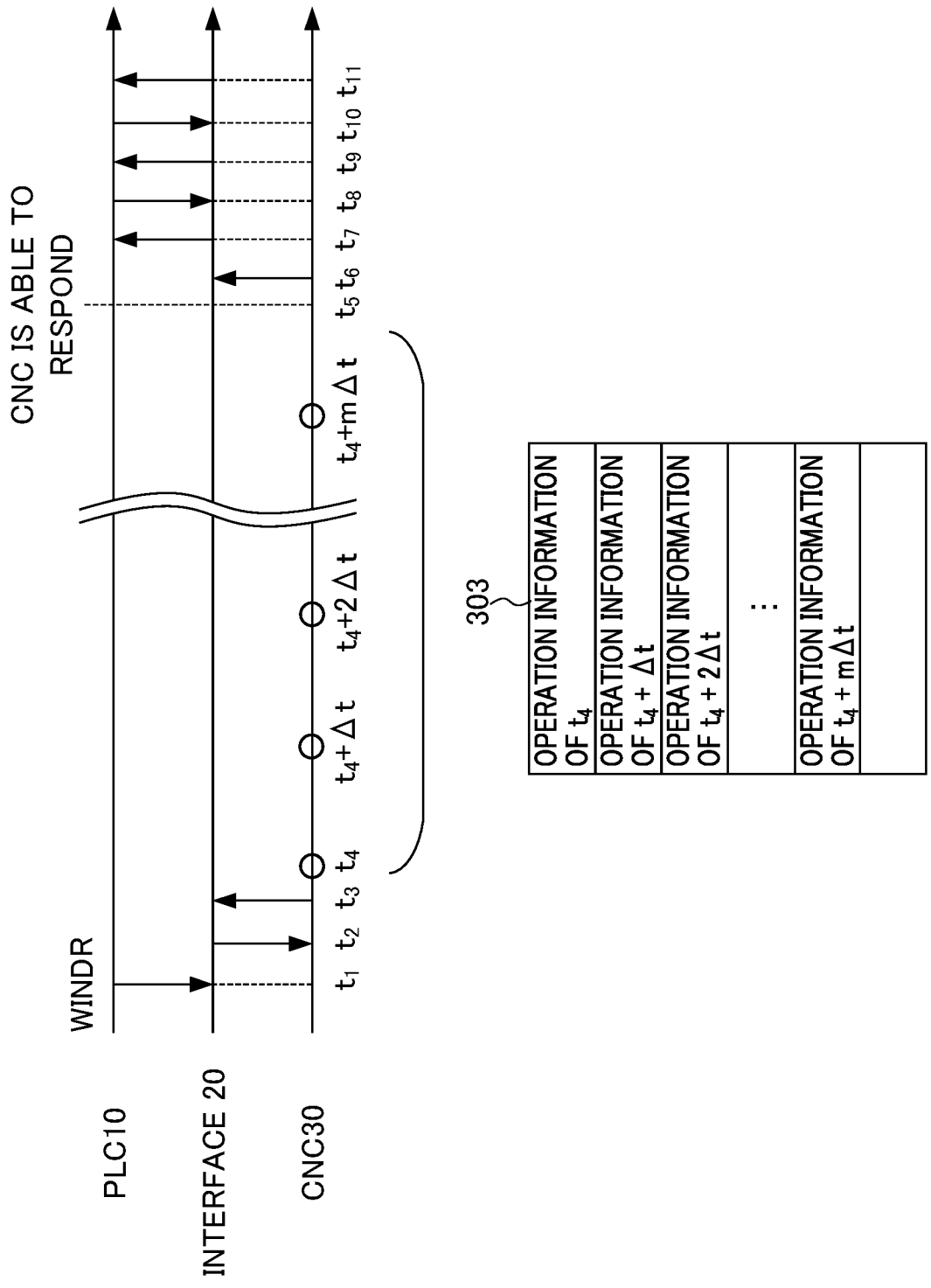

PLC DEVICE AND CONTROL DEVICE

This application is based on and claims the benefit of priority from Japanese Patent Application No. 2019-121422, filed on 28 Jun. 2019, the content of which is incorporated herein by reference.

BACKGROUND OF THE INVENTION

Field of the Invention

The present invention relates to a PLC device and a control device.

Related Art

With machine tools, machining of complicated shapes, etc. may be carried out on the basis of numerical control of the moving distance, the moving speed, etc. of tools by CNC (Computerized Numerical Control) and PLC (Programmable Logic Controller). In this case, the PLC may want to refer to the state of each axis of XYZ, etc. in the machine tool in the sequence control.

In this regard, a special instruction such as WINDR instruction is known in the PLC to read the state of the CNC through the window between CNC and PLC. For example, see Non-Patent Document 1.

"Non-Patent Document 1: "When reading CNC information with WINDR and WINDW"

SUMMARY OF THE INVENTION

As shown in FIG. 1A, the PLC transmits the special instruction of WINDR to the CNC via the interface at the desired timing and acquires the operation information of the CNC from the CNC. It should be noted that the horizontal axis represents time in FIG. 1A. In addition, WINDR(A) and WINDR(B) indicate instructions for acquiring different pieces of operation information from each other, such as CNC information and axis information.

However, in the original application, it is necessary for the PLC to acquire the operation information corresponding to the periodic operation of the PLC; however, once the special instruction is executed, the execute permission is occupied until it is completed. For example, depending on the timing of machining, the loading status, etc. of the CNC, the PLC cannot acquire the operation information of the CNC at the expected timing, and thus, needs to wait.

As shown in the FIG. 1B, even if the PLC transmits the first WINDR(A) to the CNC, if the interface receives the notification from the CNC indicating that the CNC is unable to respond due to the timing of machining, the loading status, etc. from the CNC at the time $t_a$, the PLC cannot receive a response from the CNC until the time $t_b$ when the CNC becomes able to respond. In this case, the CNC overwrites the data for each control cycle of the CNC denoted by the dotted circles, so that the data to be originally returned cannot be returned.

That is, the PLC cannot acquire the operation information of the CNC at the expected time, and thus, acquires the latest operation state acquired at the timing (time $t_c$) that can be responded by the CNC after the time $t_b$ at which the CNC becomes able to respond. In addition, the PLC is unable to transmit the second WINDR(B), etc. until it receives a reply to the first WINDR(A) from the CNC.

Thus, in the PLC, the interval for acquiring the operation information of the CNC is often disturbed, and thus, it is sometimes difficult to acquire the operation information of the CNC corresponding to the periodic operation.

Therefore, even when the CNC is unable to respond due to the timing of machining, the loading status, etc., it is desirable to be able to acquire the operation information of the CNC corresponding to the periodic operation of the PLC.

(1) According to an aspect of the PLC device of the present disclosure, the PLC device includes: a special instruction control unit that sets, to a special instruction for acquiring operation information indicating an operation state of a control device from the control device controlling an industrial machine, a cyclic time for causing the control device to periodically acquire and retain the operation information in a case in which the control device is unable to respond, and transmits to the control device the special instruction in which the cyclic time is set; and an acquisition unit that acquires the operation information acquired on the basis of the cyclic time from the control device.

(2) According to another aspect of the control device of the present disclosure, the control device includes: an information acquiring unit that periodically acquires the operation information on the basis of the cyclic time, in a case of being unable to respond to the special instruction transmitted by the PLC device according to (1) above, an information retaining unit that retains the operation information acquired by the information acquiring unit, in the case of being unable to respond, and a communication unit that collectively transmits the operation information retained by the information retaining unit, in a case of being able to respond.

According to one aspect, even when the CNC is unable to respond due to the timing of machining, the loading status, etc., it is possible to acquire the operation information of the CNC corresponding to the periodic operation of the PLC.

BRIEF DESCRIPTION OF THE DRAWINGS

FIG. 4 is a diagram showing an example for explaining communication processing of the numerical control system when the CNC is unable to respond due to the timing of machining, the loading status, etc.

DETAILED DESCRIPTION OF THE INVENTION

Embodiment

First, an outline of the present embodiment will be described. In the present embodiment, PLC transmits to CNC a special instruction (WINDR) in which the cyclic time corresponding to the periodic operation of the PLC is set in order to cause the CNC to periodically acquire and retain the operation information of the operation state even when the CNC is unable to respond due to the timing of machining, the loading status, etc. (e.g., "busy state").

When the CNC is unable to respond due to the timing of machining, the loading status, etc., the CNC acquires operation information and buffers at the cycle of the time interval of the cyclic time transmitted. At the timing at which the CNC becomes able to respond, the CNC transmits collectively the operation information acquired from the requested timing until the CNC becomes able to respond on the basis of the cyclic time.

With such a configuration, according to the present embodiment, it is possible to solve the above-described problem that "even when the CNC is unable to respond due to the timing of machining, the loading status, etc., it is possible to acquire the operation information of the CNC corresponding to the periodic operation of the PLC".

The outline of the present embodiment is described above.

Next, a detailed description will be given of the configuration of the present embodiment with reference to the drawings.

Figure 1A:
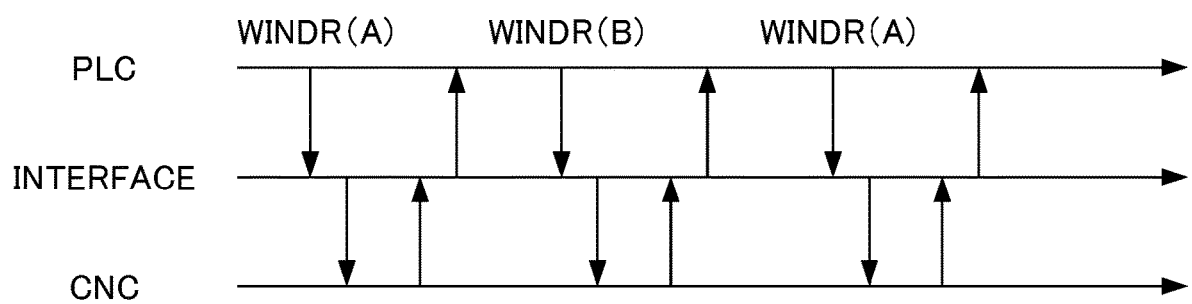
FIG. 1A is a diagram showing an example for explaining the communication between PLC and CNC in a normal state.
Figure 1B:
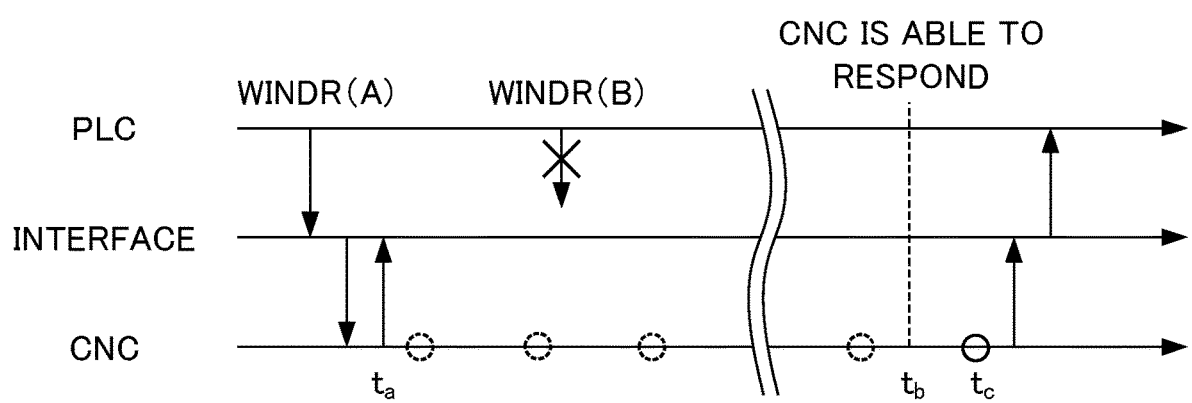
FIG. 1B is a diagram showing an example for explaining the communication between the PLC and the CNC when the CNC is unable to respond due to the timing of machining, loading status, etc.
Figure 2:
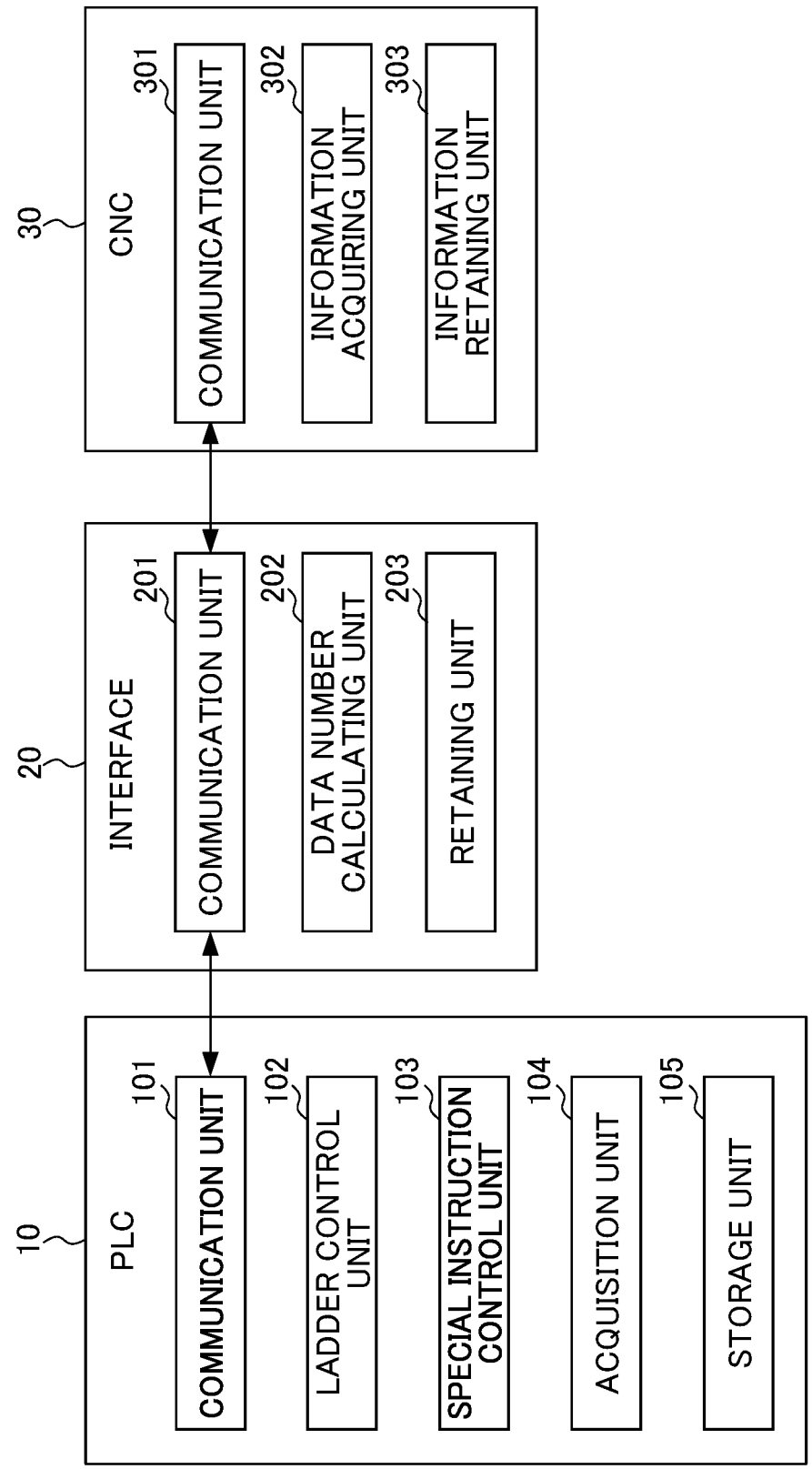
FIG. 2 is a diagram showing an example of the configuration of a numerical control system according to an embodiment.

FIG. 2 is a diagram showing an example of the configuration of a numerical control system according to the present embodiment. As shown in FIG. 2, the numerical control system includes a PLC 10, an interface 20, and a CNC 30. It should be noted that the interface 20 may be incorporated into the PLC 10 or the CNC 30.

The PLC 10, the interface 20, and the CNC 30 may be connected to each other via a bus. Furthermore, the PLC 10, the interface 20, and the CNC 30 may also be connected to each other via wires or wirelessly, or via an network (not shown), such as LAN (Local Area Network) or the Internet.

PLC 10

The PLC 10 is a PLC device known to a person skilled in the art which executes a sequence control program such as a ladder program and performs various kinds of control, arithmetic processing, input/output processing of signals, and the like according to the ladder program.

As shown in FIG. 2, the PLC 10 includes a communication unit 101, a ladder control unit 102, a special instruction control unit 103, an acquisition unit 104, and a storage unit 105.

The communication unit 101 controls communication with the interface 20.

The ladder control unit 102 interprets the ladder program and controls the input/output signal, for example, in accordance with the interpretation.

The special instruction control unit 103 transmits a special instruction of WINDR for acquiring the operation information indicating the operation state of the CNC 30 to be described later to the interface 20 on the basis of an instruction from the ladder control unit 102.

More specifically, when the CNC 30 is unable to respond due to the timing of machining, the loading status, etc., the special instruction control unit 103 sets the cyclic time corresponding to the periodic operation of the PLC 10 as an argument to the WINDR in order to cause the CNC 30 to periodically acquire and retain the operation information.

Furthermore, the special instruction control unit 103 may set, as the argument to the WINDR, the maximum receivable number (e.g., "10") which is the number of pieces of the operation information the PLC 10 can acquire in one communication from the interface 20.

Furthermore, the special instruction control unit 103 transmits the WINDR in which the cyclic time and the maximum receivable number are set, to the interface 20 via the communication unit 101.

Figure 3A:
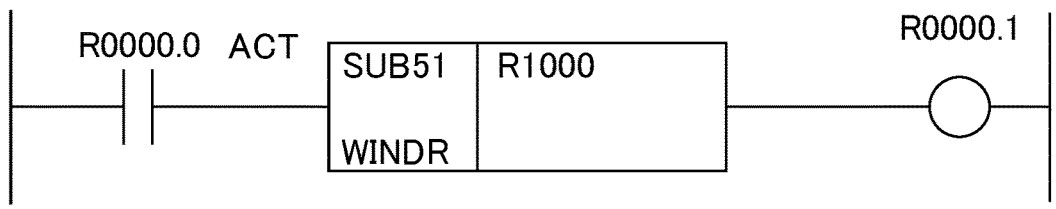
FIG. 3A is a diagram showing an example of a net number in which WINDR is coded in a ladder program.

FIG. 3A is a diagram showing an example of a net number in which the WINDR is coded in a ladder program.

As shown in FIG. 3A, the contact of address R0000.0, which is a 1-bit value, is an A contact. That is, when the contact of the address R0000.0 is "1", the rung is executed. "ACT" indicates that the contact of address R0000.0 is an activation condition of the function instruction.

Next, an element having the number of the function instruction of "SUB51" is indicated as a special instruction of the WINDR. The "R1000" of the WINDR indicates the start address of the storage area to store the control data of the WINDR.

Finally, an element of address R0000.1, which is a 1-bit value, is also referred to as a write coil. When the function instruction is completed, the value is "1".

Figure 3B:
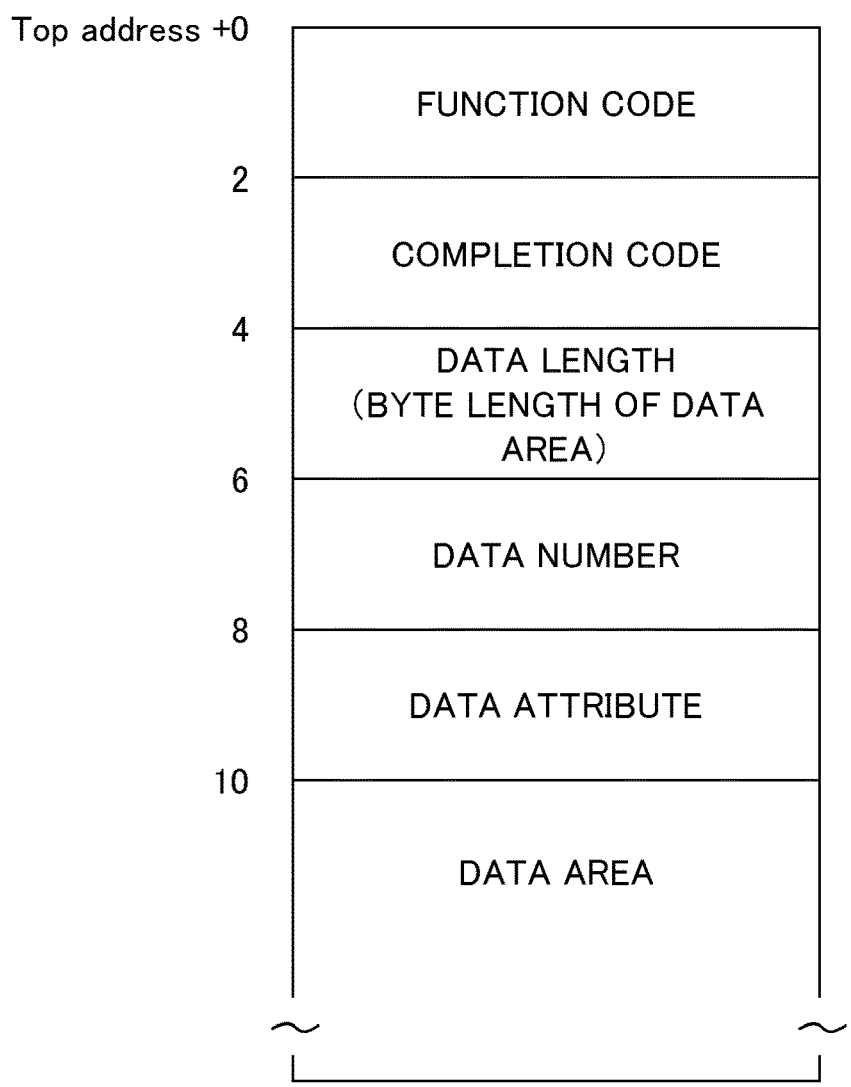
FIG. 3B is a diagram showing an example of data included in the control data of WINDR of FIG. 3A.

FIG. 3B is a diagram showing an example of data included in the control data of the WINDR of the FIG. 3A.

As shown in 3B, the control data of the WINDR includes "function code", "completion code", "data length (byte length of the data area)", "data number", "data attribute", and "data area".

For the "function code", a code according to the operation information that is desired to be acquired from CNC 30 described later is set. The operation information includes CNC information, axis information, a tool life management function, and a tool management function.

Here, the CNC information includes CNC system information, a tool offset amount, a work origin offset amount, a CNC side alarm state, etc. In addition, the axis information includes the actual speed of the control axis, the absolute position of the control axis, the load current value of the feed motor, the actual spindle rotation number, etc. Furthermore, the tool life management function includes the tool group number, the number of tool groups, the number of tools, the tool life, etc. of the tool life management function data. In addition, the tool management function includes search of empty pots, search of the tool management data, magazine property data, pot property data, tool shape data, etc.

For example, a function code of "0" is set in advance for reading the "CNC system information" of the CNC information, and a function code of "13" is set in advance for reading the "tool offset amount".

"0" indicating normal completion, "1" indicating error (error of function code), and "2" indicating error (error of data block length) are set in the "completion code".

For the "data length" (byte length of the data area), for example, the total number of pieces of the operation information (hereinafter, referred to as "number of retrievals") acquired by the interface 20 from the CNC 30 may be set. Furthermore, in the "data length (byte length of the data area)", the number of pieces of the operation information (hereinafter, also referred to as "remaining number") that is retained by the interface 20 and has not been transmitted to the PLC 10 may be set.

For example, the axis number is set for the "data attribute". For example, when "0" is set to the "data attribute", it indicates that no axis has been specified. Also, if any value k from "1" to "n" is set to the "data attribute", it indicates that the k-th axis is specified (n indicates an integer greater than or equal to 1, and k indicates an integer from 1 to n). When "−1" is set as the "data attribute", it indicates that all of the axes have been specified.

For example, the start address R1010 of the data area in which the maximum receivable number of data the WINDR can receive from the interface 20 can be stored is set in the "data area". For example, when the maximum receivable number is "10" and the data length is 1 byte, the data area from the address R1010 to the address R1020 is secured in the "data area". It should be noted that the maximum receivable number is not limited "10", or the data length is not limited to 1 byte, and thus, any maximum receivable number other than "10", and any data length other than 1 byte may be set.

The acquisition unit 104 acquires the operation information of the CNC 30 from the interface 20 through the data area via the communication unit 101. The acquisition unit 104 may store the acquired operation information in the storage unit 105 to be described later.

It should be noted that the acquisition unit 104 may transmit to the interface 20 a signal requesting the operation information that has not been transmitted in a case in which the remaining number of pieces of the operation information that has not been transmitted is not "0". That is, the acquisition unit 104 may repeatedly transmit to the interface 20 the signal requesting the operation information that has not been transmitted until the remaining number of pieces of the operation information that has not been transmitted becomes "0".

Furthermore, the acquisition unit 104 may transmit the signal requesting the operation information that has not been transmitted in a case in which it is possible for the acquisition unit 104 to acquire according to the loading status or the like of the communication with the interface 20.

The storage unit 105 is RAM (Random Access Memory) or the like, and may store the cyclic time corresponding to the periodic operation of the PLC 10, the operation information of the CNC 30 acquired by the acquisition unit 104, etc.

Interface 20

The interface 20 is an interface which is known to those skilled in the art, such as, for example, PCIe (Peripheral Component Interconnect Express). The interface 20 relays communication between the PLC 10 and the CNC 30.

As shown in FIG. 2, the interface 20 has a communication unit 201, a data number calculating unit 202, and a retaining unit 203.

The communication unit 201 controls the communication with the PLC 10 and the communication with the CNC 30.

The data number calculating unit 202, for example, calculates the remaining number of pieces of the operation information that is retained by the retaining unit 203 to be described later and has not been transmitted to the PLC 10.

The retaining unit 203 is, for example, RAM or the like, and retains the operation information received from the CNC 30.

CNC 30

The CNC 30 is a numerical control device known to those skilled in the art, and controls the operation of a machine tool (not shown). In the present embodiment, the machine tool (not shown) can be widely applied to industrial machines in general. The industrial machines include, for example, machine tools, industrial robots, service robots, forging machines and injection molding machines. In addition, in a case in which the machine tool (not shown) is a robot, the CNC 30 includes a robot control device, etc.

As shown in FIG. 2, the CNC 30 has a communication unit 301, an information acquiring unit 302, and an information retaining unit 303.

The CNC 30 includes an arithmetic processor (not shown) such as a CPU (Central Processing Unit) in order to realize the operation of the functional blocks of FIG. 2. The CNC 30 also includes an auxiliary storage device (not shown) such as ROM (Read Only Memory) or a HDD (Hard Disk Drive) which stores various kinds of control programs, and a main storage device (not shown) such as RAM which stores data that is temporarily required for the arithmetic processor to execute the programs.

In the CNC 30, the arithmetic processor reads the OS or application software from the auxiliary storage device, and expands the OS and application software thus read in the main storage device to perform arithmetic processing based on the OS or application software thus read. The CNC 30 controls hardware components on the basis of the arithmetic processing result. With such a configuration, the processing of the functional blocks shown in FIG. 2 is realized. That is, the CNC 30 can be realized by the cooperation of hardware and software.

The communication unit 301, for example, controls the communication with the interface 20 in accordance with the operation state such as the timing of machining and the loading status in the CNC 30.

When the CNC 30 is unable to respond due to the timing of machining or the loading status, the information acquiring unit 302 acquires the operation information notified from the interface 20 at the cycle of the time interval of the cyclic time. The information acquiring unit 302 outputs the acquired operation information to the information retaining unit 303. It should be noted that when the CNC 30 is in the normal state, the information acquiring unit 302 may transmit the operation information acquired on the basis of the command from the interface 20 to the interface 20 through the communication unit 301.

The information retaining unit 303 is, for example, a buffer or the like, and when the CNC 30 is unable to respond due to the timing of machining, the loading status, etc., the information retaining unit 303 sequentially retains the operation information acquired by the information acquiring unit 302.

Communication Processing of Numerical Control System

Next, a description will be given of the operation relating to the communication processing of the numerical control system according to the present embodiment when the CNC 30 is unable to respond due to the timing of machining, the loading status, etc.

FIG. 4 is a diagram showing an example explaining communication processing of the numerical control system when the CNC 30 is unable to respond due to the timing of machining, the loading status, etc.

At time $t_1$, the special instruction control unit 103 of the PLC 10 transmits to the interface 20 the WINDR in which the cyclic time $\Delta t$ corresponding to the periodic operation of the PLC 10 and the maximum receivable number of the operation information that can be acquired by one communication from the interface 20 are set.

At time $t_2$, the communication unit 201 of the interface 20 notifies the CNC 30 of the cyclic time $\Delta t$ and a command for acquiring the operation information specified by the "function code" of the control data of the WINDR received from the PLC 10.

At time $t_3$, the CNC 30 transmits to the interface 20 a notification indicating that the CNC 30 is unable to respond according to the timing of machining, the loading status, etc.

At time $t_4$, the information acquiring unit 302 of the CNC 30 starts logging at the cycle of the time interval of the cyclic time $\Delta t$ notified from the interface 20 until the CNC 30 becomes able to respond, and acquires the operation information. The information retaining unit 303 sequentially retains the operation information acquired by the information acquiring unit 302.

In a case in which the CNC 30 becomes able to respond at time $t_5$, the communication unit 301 of the CNC 30 transmits the operation information of time $t_4+m\Delta t$ collectively from time $t_4$ retained in the information retaining unit 303 to the interface 20 (m is an integer of 1 or more) at time $t_6$.

Thereafter, the interface 20 acquires the operation information of time $t_4+m\Delta t$ from time $t_4$ from the CNC 30, and retains the operation information of time $t_4+m\Delta t$ from the acquired time $t_4$ to the retaining unit 203.

At time $t_7$, the data number calculating unit 202 of the interface 20 calculates the remaining number of the operation information retained in the retaining unit 203 after transmitting the operation information of the maximum receivable number to the PLC 10. For example, when the maximum receivable number is "10" and the acquired number of pieces of operation information received from the CNC 30 is "25", the data number calculating unit 202 calculates the remaining number "15". The communication unit 201 stores the acquired number "25" and/or the remaining number "15" in the "data length (byte length of the data area)" of the control data, and transmits the WINDR in which the maximum receivable number of pieces of the operation information "10" that can be received in the "data area" is stored to the PLC 10.

The acquisition unit 104 of the PLC 10 acquires from the interface 20, together with the acquired number "25" and/or the remaining number "15", the operation information of the CNC 30 of the maximum receivable number "10" through the data area.

It should be noted that the interface 20 notifies of the acquired number and/or the remaining number; however, the present invention is not limited thereto, and thus, for example, the interface 20 may notify of only the remaining number. In so doing, the PLC 10 can request to transmit until the remaining number becomes "0".

Alternatively, the interface 20 may notify of only the acquired number. With such a configuration, the PLC 10 can request to transmit until it acquires the operation information corresponding to the acquired number.

At time $t_8$, since the remaining number of pieces of the operation information that has not been transmitted is "15", the acquisition unit 104 transmits a signal requesting the remaining operation information to the interface 20.

That is, the PLC 10 can request to transmit until the remaining number becomes "0" by acquiring the remaining number of pieces of the operation information that has not been transmitted from the interface 20.

At time $t_9$, the data number calculating unit 202 of the interface 20 obtains from the calculation the remaining number "5" of the operation information retained in the retaining unit 203 after transmitting the operation information of the maximum receivable number "10". The communication unit 201 stores the acquired number "25" and the remaining number "5" in "the data length (byte length of the data area)" of the control data, and transmits to the PLC 10 the WINDR in which the operation information having "10" pieces of the maximum receivable number in the "data area" is stored.

The acquisition unit 104 of the PLC 10 acquires from the interface 20 the operation information of the CNC 30 having "10" pieces of the maximum receivable number through the data area, together with "25" pieces of the acquired number and "5" pieces of the remaining number.

At time $t_{10}$, the acquisition unit 104 transmits a signal requesting the remaining operation information to the interface 20 since the remaining number of the operation information that has not been transmitted is "5".

At time $t_{11}$, the data number calculating unit 202 of the interface 20 obtains from the calculation the remaining number "0" of the operation information retained in the retaining unit 203 after transmitting the operation information of "10" pieces of the maximum receivable number. The communication unit 201 stores "25" pieces of the acquired number and "0" pieces of the remaining number in "the data length (byte length of the data area)" of the control data, and transmits to the PLC 10 the WINDR in which 5 pieces of the operation information are stored in the "data area".

Thereafter, the acquisition unit 104 of the PLC 10 acquires from the interface 20 5 pieces of the operation information of the CNC 30 through the data area, together with "25" pieces of the acquired number and "0" pieces of the remaining number.

As described above, the PLC 10 of the embodiment transmits the special instruction of the WINDR in which the cyclic time $\Delta t$ corresponding to the periodic operation of the PLC 10 is set to the interface 20. In a case in which the CNC 30 is unable to respond due to the timing of machining, the loading status, etc., the CNC 30 acquires and retains (buffers) the operation information at the cycle of the time interval of the cyclic time $\Delta t$ received through the interface 20. Thereafter, in a case in which the CNC 30 becomes able to respond, the CNC 30 transmits the retained operation information to the interface 20. The interface 20 transmits data of the operation information received from the CNC 30 to the PLC 10.

With such a configuration, even in a case of the special instruction such as WINDR of the logging application, the PLC 10 can reliably acquire the data of the operation information of the CNC 30 corresponding to the cycle of the cyclic time $\Delta t$.

Furthermore, in a case in which a bus such as PCIe is used, the interface 20 transmits the data of the operating information of the CNC 30 collectively so that efficient communication can be performed with the PLC 10.

Although one embodiment has been described above, the PLC 10, the interface 20, and the CNC 30 are not limited to the above-described embodiment, and include modifications, improvements, and the like to the extent that an object of the present invention can be achieved.

Modification Example 1

In the above-described embodiment, although the interface 20 is an independent device from the PLC 10 and the CNC 30, the interface 20 may be incorporated into the PLC 10 or the CNC 30.

Furthermore, the PLC 10 and the CNC 30 may communicate directly with each other without going through the interface 20.

Modification Example 2

For example, in the above-described embodiment, the PLC 10 transmits to the interface 20 the signal requesting to transmit the operation information that has not been transmitted until the number of pieces of the operation information that has not been transmitted and has been set in the control data of the WINDR becomes "0"; however, the present invention is not limited thereto. For example, the PLC 10 may repeat acquiring the operation information of the CNC 30 from the interface 20 until the number of the operation information that has not been transmitted becomes "0", even without transmitting the requested signal to the interface 20.

Modification Example 3

For example, although the maximum receivable number is "10" in the above-described embodiment, it may be appropriately determined depending on the communication capability of the bus between the PLC 10 and the interface 20.

It should be noted that each function included in the PLC 10, the interface 20, and the CNC 30 according to the embodiment can respectively be implemented by hardware, software, or a combination thereof. Herein, being realized by software indicates being realized by a computer reading and executing programs.

The programs can be stored on any of various types of non-transitory computer readable media and be provided to a computer. The non-transitory computer readable media include various types of tangible storage media. Examples of non-transitory computer readable media include magnetic recording media (e.g., flexible disks, magnetic tapes, hard disk drives), magneto-optical media (e.g., magneto-optical disks), CD-ROM (Read Only Memory), CD-R, CD-R/W, semiconductor memory (e.g., mask ROM, PROM (Programmable ROM), EPROM (Erasable PROM), flash ROM, RAM). In addition, the programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber, or the like or a wireless communication path.

A step of writing programs to be recorded on a recording medium includes processing that is performed in a time series manner according to the order and processing that is performed in a parallel or independent manner, even if the processing is not necessarily performed in a time series manner.

In other words, the PLC device and control device of the present disclosure can assume various embodiments having the following configurations.

(1) The PLC device (PLC 10) of the present disclosure includes: a special instruction control unit 103 that sets, to a special instruction for acquiring operation information indicating an operation state of a control device (CNC 30) from the control device controlling an industrial machine, a cyclic time $\Delta t$ for causing the control device to periodically acquire and retain the operation information in a case in which the control device is unable to respond, and transmits to the control device the special instruction in which the cyclic time $\Delta t$ is set; and an acquisition unit 104 that acquires the operation information acquired at the time interval of the cyclic time $\Delta t$ on the basis of a special instruction from the control device.

According to the PLC device, it is possible to acquire the data of the operation information of the CNC 30 corresponding to the periodic operation even in a case in which the CNC 30 is unable to respond due to the timing of machining, the loading status, etc.

(2) Communication with the control device may be performed via an interface.

With such a configuration, it is possible to perform efficient communication with the CNC 30.

(3) The interface 20 may include a retaining unit 203 that retains the operation information received from the control device, the special instruction control unit 103 may transmit the special instruction in which the cyclic time $\Delta t$ and a maximum receivable number indicating a number of pieces of the operation information that can be acquired by one communication from the interface 20 are set, and the acquisition unit 104 may acquire from the interface 20 a number of pieces of the operation information which is equal to or less than the maximum receivable number.

With such a configuration, since the data of the operation information of the CNC 30 is transmitted collectively, it is possible to perform efficient communication with the interface 20.

(4) The interface 20 may include a data number calculating unit 202 that calculates a number of the pieces of the operation information that is retained by the retaining unit 203 and has not been transmitted, and the acquisition unit 104 may acquire from the interface 20 the operation information until the number of the pieces of the operation information calculated by the data number calculating unit 202 becomes zero.

With such a configuration, it is possible to acquire all of the data of the operation information acquired by the CNC 30.

(5) The control device (CNC 30) includes: an information acquiring unit 302 that periodically acquires the operation information on the basis of the cyclic time $\Delta t$, in a case of being unable to respond to the special instruction transmitted by the PLC device (PLC 10) according to any one of (1) to (4) above, an information retaining unit 303 that retains the operation information acquired by the information acquiring unit 302, in the case of being unable to respond, and a communication unit 301 that collectively transmits the operation information retained by the information retaining unit 303 to the interface 20, in a case of being able to respond.

According to the control device, it is possible to acquire the data of the operation information corresponding to the periodic operation of the PLC 10, even in a case in which the CNC 30 is unable to respond according to the timing of machining, the loading status, etc.

EXPLANATION OF REFERENCE NUMERALS

10 PLC
103 special instruction control unit
104 acquisition unit
20 interface
202 data number calculating unit
203 retaining unit
30 CNC
301 communication unit
302 information acquiring unit
303 information retaining unit

What is claimed is:
1. A PLC device comprising:
a memory configured to store a program; and
a processor configured to execute the program and control the PLC device to:

set, to a special instruction for acquiring operation information indicating an operation state of a control device from the control device controlling an industrial machine, a cyclic time corresponding to an operation of the PLC as an argument for causing the control device to acquire and retain, per the cyclic time, the operation information in a case in which the control device is unable to respond, and transmits to the control device the special instruction in which the cyclic time is set; and collectively acquire, at a time not related to the cyclic time, the operation information acquired and retained by the control device during the case in which the control device is unable to respond on the basis of the cyclic time from the control device, the acquired operation information having been transmitted from the control device to the PLC device during the case in which the control device is able to respond.

2. The PLC device according to claim 1, wherein communication with the control device is performed via an interface.

3. The PLC device according to claim 2, wherein the interface includes a retaining unit that retains the operation information received from the control device, the processor is further configured to execute the program and control the PLC device to transmit the special instruction in which the cyclic time and a maximum receivable number indicating a number of pieces of the operation information that can be acquired by one communication from the interface are set, and the processor is further configured to execute the program and control the PLC device to acquire from the interface a number of pieces of the operation information which is equal to or less than the maximum receivable number.

4. The PLC device according to claim 3, wherein the interface includes a data number calculating unit that calculates a number of the pieces of the operation information that is retained by the retaining unit and has not been transmitted, and the processor is further configured to execute the program and control the PLC device to acquire from the interface the operation information until the number of the pieces of the operation information calculated by the data number calculating unit becomes zero.

5. A control device comprising:

an information acquiring unit that acquires the operation information on the basis of the cyclic time, in a case of the control device being unable to respond to the special instruction transmitted by the PLC device according to claim 1, an information retaining unit that retains the operation information acquired by the information acquiring unit, in the case of being unable to respond, and a communication unit that collectively transmits the operation information retained by the information retaining unit, in a case of being able to respond.

\* \* \* \* \*